United States Patent

Chakko

[11] Patent Number: 5,139,244
[45] Date of Patent: Aug. 18, 1992

[54] SLIPPER BUSHING ASSEMBLY

[75] Inventor: Mathew K. Chakko, Wabash, Ind.

[73] Assignee: GenCorp Inc., Fairlawn, Ohio

[21] Appl. No.: 416,213

[22] Filed: Sep. 29, 1989

[51] Int. Cl.$^5$ .............................. F16F 1/44
[52] U.S. Cl. .................. 267/293; 384/215; 267/141.2
[58] Field of Search .......... 267/141, 140.4, 141.2, 267/141.4, 141.7, 152, 153, 293, 276, 281; 16/2; 280/673, 700, 721; 384/215, 220, 222, 297, 909, 913

[56] References Cited

U.S. PATENT DOCUMENTS

| | | | |
|---|---|---|---|
| Re. 32,595 | 2/1988 | Davies | 384/297 X |
| 3,171,699 | 3/1965 | Maxey | 384/222 |
| 4,477,197 | 10/1984 | Choate | 384/297 |
| 4,666,792 | 5/1987 | Bickle et al. | 384/913 X |
| 4,744,677 | 5/1988 | Tanaka et al. | 384/222 |
| 4,880,319 | 11/1989 | Haggerty | 384/215 |

*Primary Examiner*—Robert J. Oberleitner
*Assistant Examiner*—Lee W. Young

[57] ABSTRACT

A slipper bushing assembly includes a rigid, inner cylindrical member, a hollow, concentric cylindrical elastomeric member having flanged ends force-fitted to the inner member and in sliding contact with the lubricated inner surface of concentric rigid polymeric outer member having recessed end portions to receive the flanged ends of the elastomeric member. The assembly is provided at each end with flanged tubular end caps press-fitted to the inner surface of the inner member to effect a seal of the lubricated interface.

6 Claims, 1 Drawing Sheet

SLIPPER BUSHING ASSEMBLY

BACKGROUND OF THE INVENTION

1. Field of the Invention

The present invention relates to bushings and specifically slipper bushings. Slipper bushings are a special type of bushing used mainly in automobile suspensions although they have other applications.

Typically a bushing is comprised of inner and outer concentric metal sleeves having a rubber or other elastomeric, hollow, cylindrical body disposed between the two sleeves. In a typical bushing application the outer metal sleeve is joined to a movable member and the inner sleeve to a support element. The bushing is constructed so as to permit controlled movement between the joined parts.

There are other applications in which bushings are used where relative movement between the parts joined by the bushing is not only desirable but necessary. In such applications one bushing construction which is used is commonly referred to as a slipper bushing. One such application of a slipper bushing is in the upper and lower, both front and rear, control arms of automotive suspension systems.

2. Prior Art

One type of slipper bushing currently in use comprises an inner metal, the outer surface of which is surrounded by a plastic tube, an intermediate concentric metal the inner surface of which is in contact with the plastic and a rubber insert between the inner surface of the outer metal and outer surface of the intermediate metal. Rotation occurs between the outer surface of the plastic tube and the inner surface of the intermediate metal. A bushing of this construction is difficult to fabricate and its service life may be significantly shortened because of corrosion of the surface of rotation.

A further shortcoming of such constructions is that it exhibits an unacceptably high breakaway torque.

SUMMARY OF THE INVENTION

It is therefore an object of the present invention to provide an improved slipper bushing assembly of relatively simple construction which allows continuous rotation at low friction and torque of the inner member relative to the outer member and which is sealed to substantially reduce or eliminate the possibility of contamination to the rotation surfaces.

According to the present invention, there is provided a bushing assembly comprising a cylindrical, rigid inner member, a hollow, concentric, cylindrical, elastomeric member having flanged ends, the inner surface of which is force-fitted to the outer surface of the rigid inner member and a rigid, hollow, cylindrical, polymeric member having recessed end portions adapted to receive the flanged ends of the elastomeric member. The inner surface of the rigid polymeric member is in sliding relation with the outer surface of the elastomeric member. This interface between the elastomeric member and the rigid polymeric member is lubricated. Flanged, tubular end caps are press-fitted to the inner surface of the inner member in sealing relation with the ends of the inner member and a portion of the ends of the elastomeric member.

These and other objects and features of the invention will be apparent from the following description with reference to the drawings.

DETAILED DESCRIPTION OF THE PREFERRED EMBODIMENT

Figure 1:
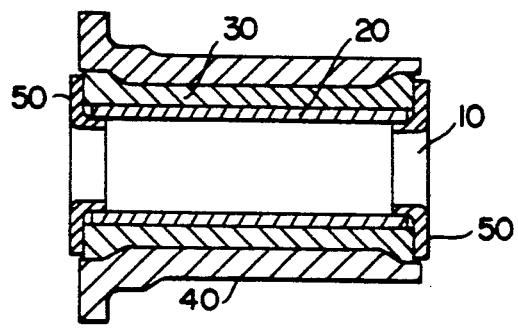
FIG. 1 is a sectional view showing a bushing assembly according to the present invention.

In FIG. 1, a bushing assembly of the present invention is shown. The bushing assembly 10 is basically comprised of an inner member 20, an elastomeric member 30 and an outer polymeric member 40. End caps 50 are used at either end of the assembly to eliminate or substantially reduce contamination to the interface 60 between the elastomer and the polymer members.

Figure 2:
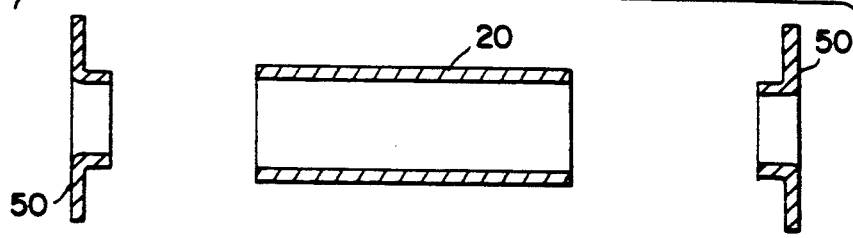
FIG. 2 is a sectional view showing the inner member of the bushing assembly and the end caps which cooperate to seal the structure.

As shown in FIG. 2 the inner member 20 is of an internal diameter chosen to facilitate mounting on the control arm of an automotive suspension system, not shown. In some applications inner member 20 may be solid, i.e., rod-like rather than hollow. While the inner member 20 is commonly made of a metal such as steel, it may also be fabricated from an engineering plastic such as PEEK which is marketed by ICI.

Figure 3:
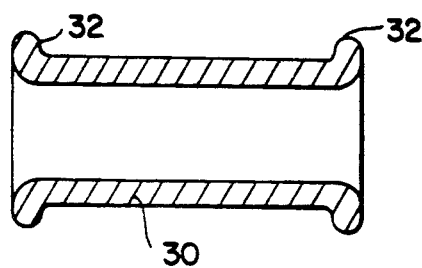
FIG. 3 is a sectional view of the elastomeric member of the bushing assembly.
Figure 4:
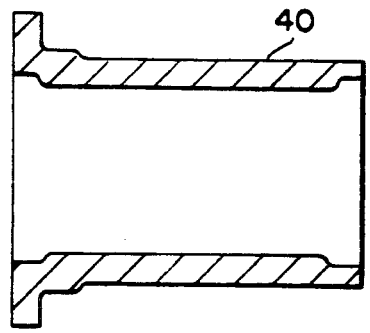
FIG. 4 is a sectional view of polymeric member of the present invention.

The internal diameter of the elastomer member 30 as shown in FIG. 3 is somewhat less than the outer diameter of the rigid inner member 20. When in an assembled condition, this insures that the fit between the inner member 20 and the elastomeric member 30 is what is commonly referred to as force-fitted. In a typical application, the outside diameter of the inner metal might be about 21 mm. and the inner diameter of the elastomeric member might be on the order of 17 mm. In a typical application, the wall thickness of the elastomeric member 30, prior to assembly, is on the order of 5 mm.

In an assembled condition the elastomeric member 30 may have a slightly smaller wall thickness. The overall length of the elastomeric insert prior to assembly is somewhat less than its length in an assembled condition. In a typical application the preassembled length was about 62 mm. and, when assembled, the length was some less about 61 mm.

It is to be noted that the elastomeric member has flanged ends 32. The flanged ends cooperate with the recesses in the polymeric member in a manner such that when end caps 50 are applied an effective seal is established to keep out materials which might adversely affect the lubricated inner face between the elastomeric member and the polymeric member. The specific configuration of the elastomeric insert is not critical as long as it forms an effective seal.

An important aspect of the bushing resides in the selection of a proper lubricant for the interface between the polymeric outer member and the elastomeric member.

There is no known method of predicting the coefficient of friction without measurement. It is a surface phenomena and can only be determined by test.

A series of experiments were run in which the rubber of the insert was varied as to hardness. In addition, a variety of lubricants were tried. The results of these tests are set out below.

SLIPPER BUSHINGS
MEASURED TORQUE VALUES
OBTAINED WITH DIFFERENT LUBRICATION SYSTEMS
AND DUROMETER RUBBERS

| Bushing No. | Insert Durometer | Lubricant at Slip Surface | Measured Slipping Torque in Newton-Meters |
| --- | --- | --- | --- |
| 1A | 55 | Silicone | 0.51 |
| 1B | 55 | Silicone | 0.45 |
| 2 | 64 | Silicone | 0.34 |
| 3 | 74 | Silicone | 1.36 |
| 4 | 55 | Oil + Graphite | 1.02 |
| 5 | 64 | Oil + Graphite | >2.3 |
| 6 | 74 | Oil + Graphite | >2.3 |
| 7 | 55 | Oil | >2.3 |
| 8 | 64 | Oil | >2.3 |
| 9 | 74 | Oil | >2.3 |
| 10 | 55 | None | >2.3 |

It can be seen that a very low slipping torque on the order of 0.5 Newton meters is only available with a silicone lubricant. The oil and graphite and oil alone all result in slipping torques that are higher, but which may be useful in some applications.

It is apparent from these experiments that the durometer of the rubber has an effect on slipping torque in that a lower durometer rubber gives a lower slipping torque than a higher durometer rubber, all other things being equal.

It is apparent from the foregoing description that the slipper bushing of the present invention presents, in the form of a polymer elastomer interface, improvements over those currently used. In addition to the reduced breakaway torque and the sealed, rotational interface encompassed in the construction, the bushing of the invention is relatively easy to fabricate.

The embodiments of the invention in which an exclusive property or privilege is claimed are defined as follows:

What is claimed is:

1. A slipper bushing assembly comprising:
   a rigid one piece inner member having a pair of opposing ends and an outer cylindrical surface;
   a concentric, hollow, cylindrical elastomeric member surrounding said inner member and having a pair opposing ends and an outer surface and an inner surface which is force-fitted to the outer surface of the inner member, said elastomeric member having an outwardly extending annular flange at each of its opposing ends,
   a rigid, concentric, hollow, cylindrical, polymeric outer member surrounding said elastomeric member and coextensive therewith, said outer member having a pair of opposing ends each with an annular recess configured to receive the annular flanges of said elastomeric member, the outer member having an inner surface which is in sliding relation with the outer surface of the elastomeric member;
   a lubricant disposed between the inner surface of the outer member and the outer surface of the elastomeric member; and
   tubular end caps at the opposing ends of the inner member, said end caps having outwardly extending annular flanges in sealing relation with adjacent ends of said inner members and at least a portion of the adjacent ends of the cylindrical elastomeric member.

2. The bushing assembly of claim 1 wherein the inner member is metal.

3. The bushing assembly of claim 2 wherein the elastomeric member is rubber.

4. The bushing assembly of claim 1 wherein the inner member is a high-strength engineering plastic.

5. The bushing assembly of claim 1 wherein the elastomeric member is rubber.

6. The bushing assembly of claim 1 wherein the inner cylinder member is hollow.

* * * * *